A. N. WARFIELD.
DOORWAY CONSTRUCTION FOR CARS.
APPLICATION FILED DEC. 20, 1918.
1,353,102.
Patented Sept. 14, 1920.
3 SHEETS—SHEET 1.
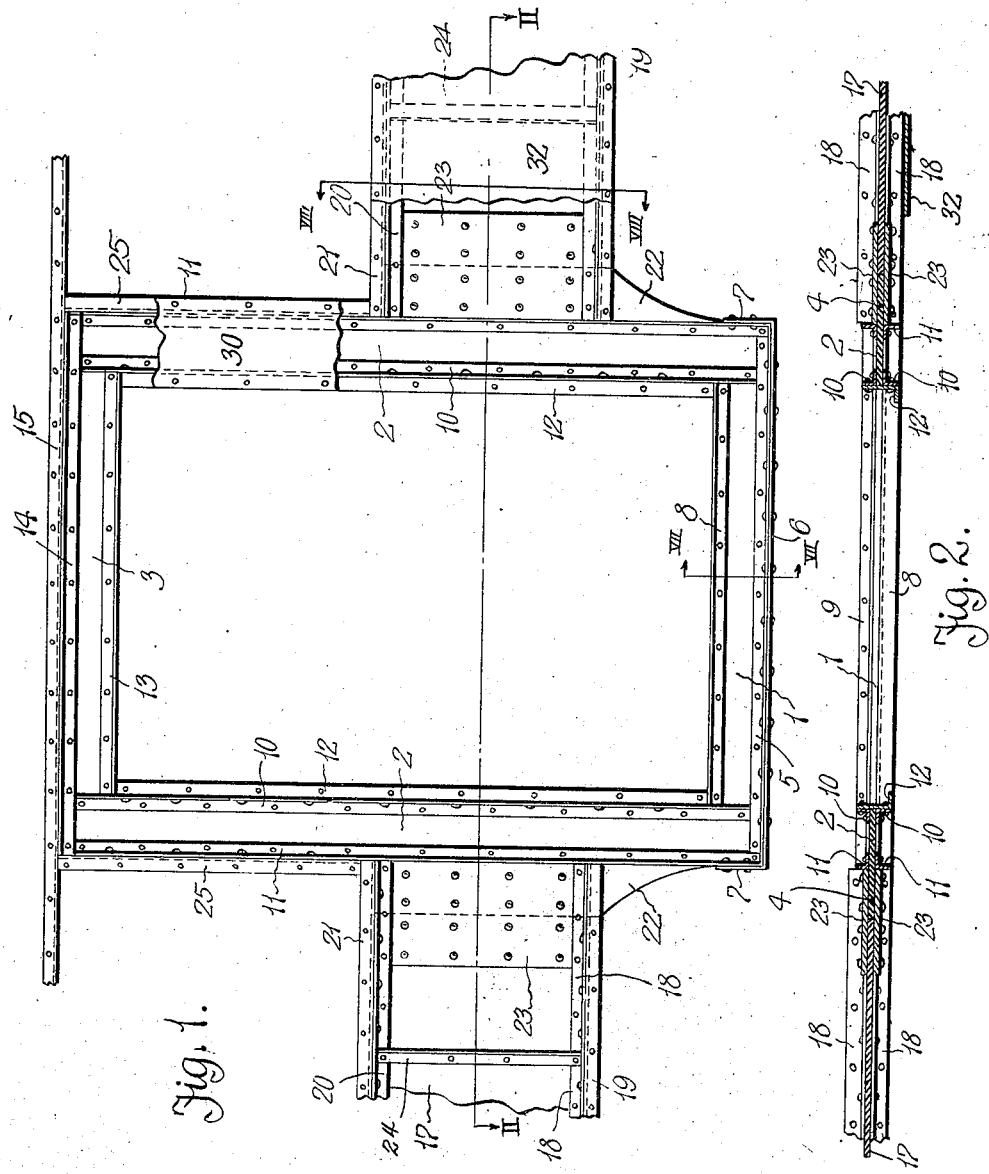

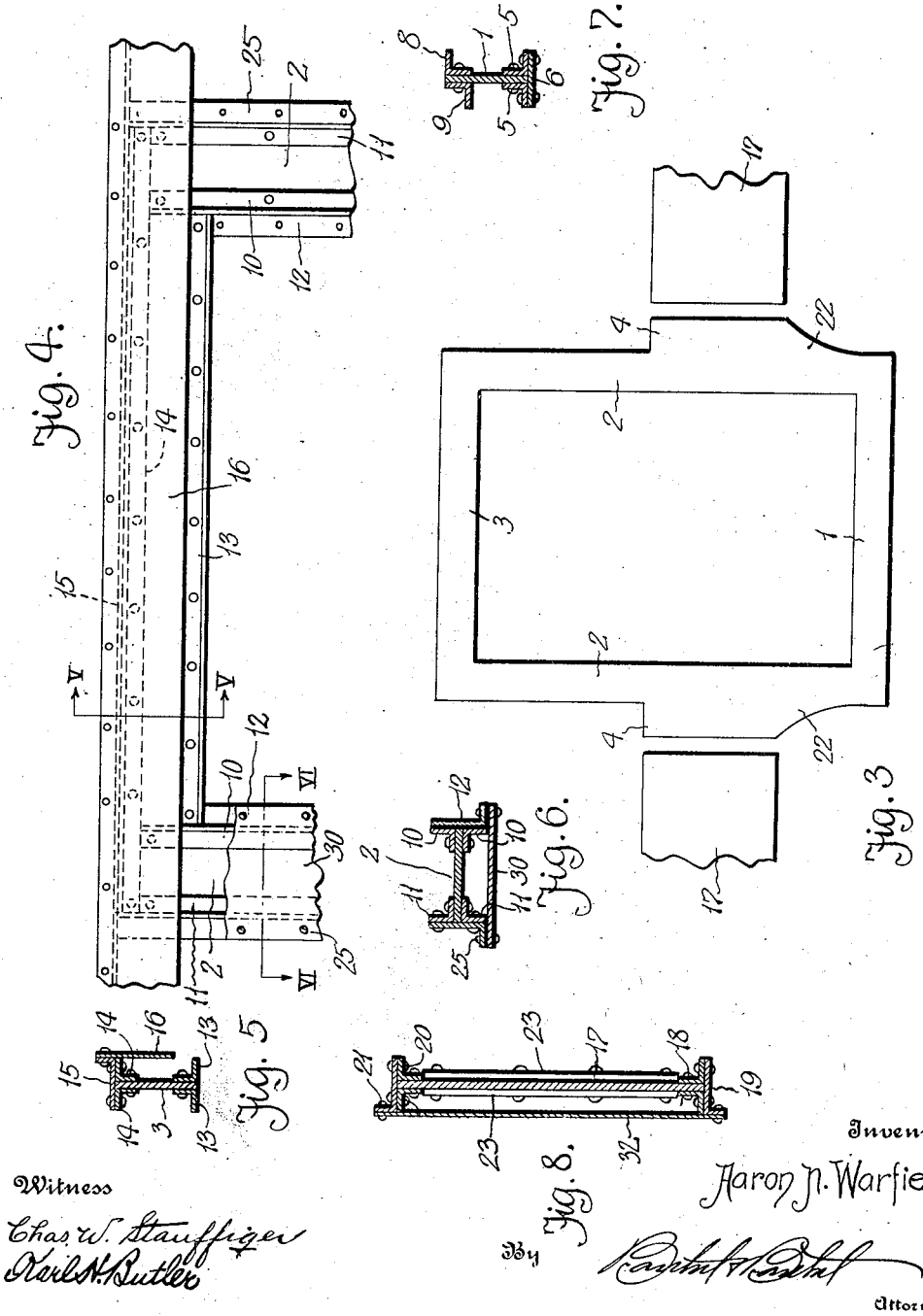

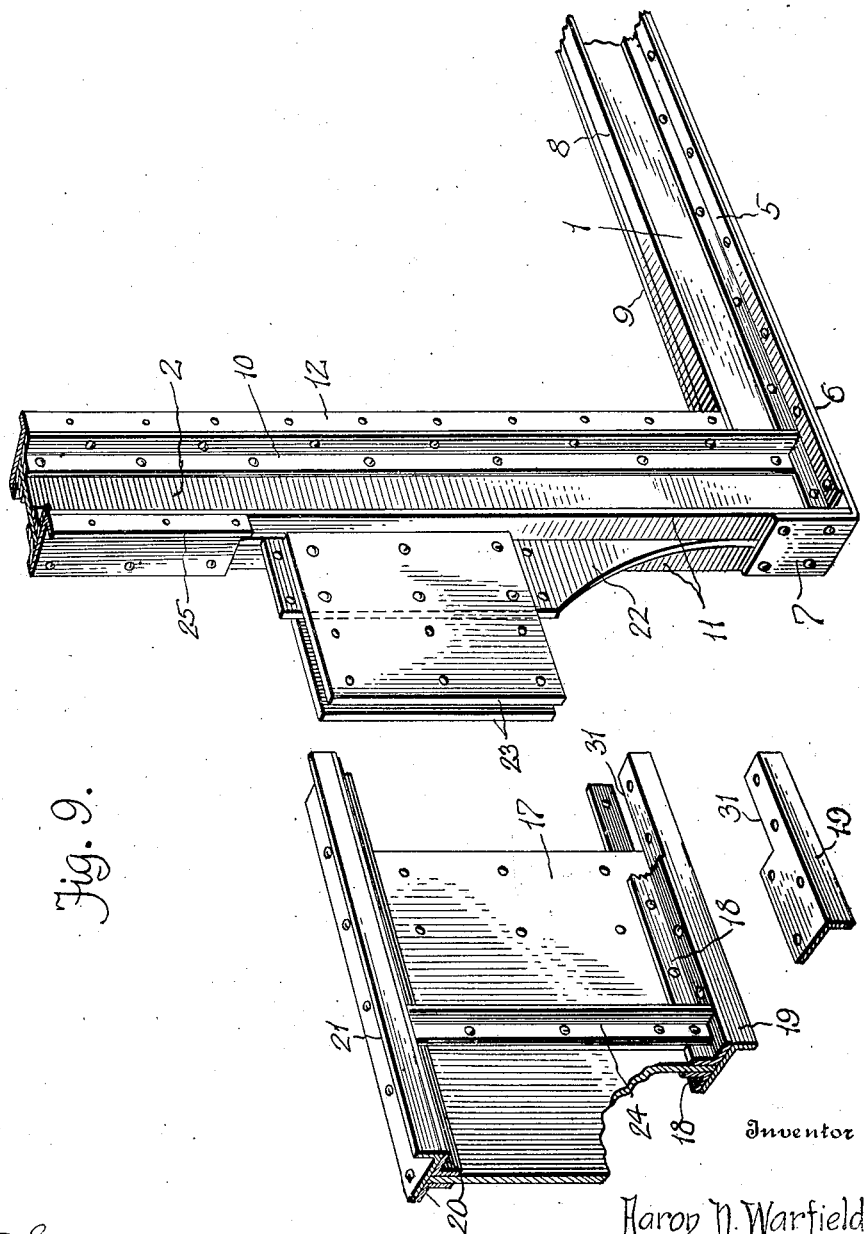

UNITED STATES PATENT OFFICE.

AARON N. WARFIELD, OF LONDON, ONTARIO, CANADA.

DOORWAY CONSTRUCTION FOR CARS.

1,353,102.  Specification of Letters Patent.  Patented Sept. 14, 1920.

Application filed December 20, 1918. Serial No. 267,592.

*To all whom it may concern:*

Be it known that I, AARON N. WARFIELD, a citizen of the United States of America, residing at London, Province of Ontario, Dominion of Canada, have invented certain new and useful Improvements in Doorway Construction for Cars, of which the following is a specification, reference being had therein to the accompanying drawings.

This invention relates to a side door construction for cars, and has reference to any car that has a doorway interrupting the side or end construction of a car body, and more especially mail and baggage cars, or any car having a doorway extending below the floor line of a car, such doorways being common in connection with street cars, particularly trailers so that there is a short step for passengers entering or leaving a car or trailer.

My invention aims to provide a doorway construction which will not sacrifice any of the strength and rigidity of side web plate girders or other longitudinal members forming part of a car body.

The doorway construction is a one-piece metallic doorway frame and the inner and outer sides of this frame are strengthened and reinforced by angle bars and plates so as to add rigidity to the one piece frame and impart cross sectional shapes thereto that will permit of the door frame withstanding stresses and strains due to the impact of cars and the vibrations set up when the cars are in use. The side edges of the door frame are constructed so that the frame may be built into the ends of side plate girders or other longitudinal members of a car body, and the construction of the doorway frame prohibits collapse thereof by compression of the side web plate girders, thus providing an interposed open or apertured member that is practically a continuation of the side plate girders of a car, so far as strength and rigidity are concerned.

The doorway construction contributes to the support of a floor, roof, or side walls adjacent thereto, and the metallic stiffening or reinforcing members associated with the doorway permits of wooden frames, doors or other fixtures being readily installed.

My invention will be hereinafter described and then claimed and reference will now be had to the drawing, wherein Figure 1 is a side elevation of a car doorway construction in accordance with my invention;

Fig. 2 is a horizontal sectional view taken on the line II—II of Fig. 1;

Fig. 3 is a side elevation of the one piece doorway frame and adjoining members;

Fig. 4 is an enlarged side elevation of a portion of the doorway construction;

Fig. 5 is a cross sectional view taken on the line V—V of Fig. 4;

Fig. 6 is a horizontal sectional view taken on the line VI—VI of Fig. 4;

Fig. 7 is a cross sectional view taken on the line VII—VII of Fig. 1;

Fig. 8 is a similar view taken on the line VIII—VIII of Fig. 1, and

Fig. 9 is a perspective view of separated portions of the doorway structure.

The one-piece doorway frame has a sill 1, side rails 2 and a lintel 3, all of which are integral and in a common plane with the outer edges of the rails 2 provided with extensions 4.

The sill 1 has the lower edge thereof, on both sides, provided with longitudinal angle bars 5 and these bars are connected by a bottom plate 6 that has the ends thereof turned upwardly, as at 7. The upper edge of the sill 1 has angle bars 8 and 9 at the outer and inner sides thereof, the angle bar 8 providing a tread member and the angle bar 9 serving as a support for flooring or other body constructions.

The rails 2 have the outer and inner sides thereof provided with angle bars 10 and 11 disposed at the edges thereof, and the angle bars 10 are connected to angle jamb members 12. The jamb members 12 extend from the lintel 3 to the sill 1 and the angle bars 10 extend past the ends of the bars 8 and 9 of the web and abut the angle bars 5 at the lower edge thereof. The angle bars 11 meet the ends of the bars 5 and are connected to the upturned ends 7 of the bottom plate 6.

The lintel 3 has the lower edge thereof, at both sides, provided with angle bars 13, and these angle bars engage the upper ends of the jamb bars 12. The upper edge of the lintel 3, at both sides, has angle bars 14 and these angle bars meet the upper ends of the angle bars 10 and 11. The angle bars 14 are also connected to a top angle or flanged plate 15 and the vertical flange of this top angle or flanged plate may be provided with a depending plate 16, as best shown in Figs. 4 and 5.

Abutting the side extensions of the rails 2 are side web plate girders 17, said girders having the lower edges thereof at both sides, provided with longitudinally disposed angle bars 18 and said angle bars are connected with angle or flanged bottom plates 19. The upper edges of the girders 17, at both sides, have longitudinal bars 20 connected by top angle plates 21, the bars 20 and plates 21 extending to the angle bars 11. This is also true of the angle bars 18 and the bottom angle or flanged plates 19, the latter being cut away as at 31, to provide clearance for the filler or the bracing portions 22 of the extensions 4.

At the juncture of the girders 17 with the extensions 4 of the rails 2, there are splice plates 23, and the bars 18 and 19 of the girders may extend on to these spliced plates, which connect the doorway extensions to the girders as though the doorway frame were integral with said girders.

The girders 17 have the sides thereof stiffened and reinforced by vertical angle bars 24, and side angle or flanged plates 25 may connect the angle bars 11 of the rails 2 and extend from the angle plates 21 to the angle or flanged top plate 15 of the lintel 3. The side angle plates 25 may coöperate with the jamb members 12 in supporting sheathing 30 for the doorway, and the flanges of the top plates 21 and bottom plates 19 may support sheathing 32.

The one piece doorway frame, its various angle bars, the plates, and other parts connected thereto or to the web plate girders 17 have been shown as secured in place by rivets, but spot welding, brazing or other securing means may be resorted to, so that the fabricated structure will possess practically the same rigidity as though cast in one piece, yet have a degree of elasticity which is essential in good car construction to prevent parts of the car body from being unnecessarily racked or fractured.

It is thought that the construction of the car doorway will be apparent without further description, and it is to be understood that the structural elements are susceptible to such variations and modifications as fall within the scope of the appended claims.

What I claim is:—

1. In a car, the combination with side girders, of a one piece doorway frame interposed between the ends of said side girders and connected thereto, said frame comprising a web having an opening, angle bars on both sides of said web at the edges of the opening thereof and at the marginal edges of said web, side angle plates connected to some of said angle bars, and jamb bars connected to other of said angle bars and adapted to coöperate therewith in supporting sheathing.

2. A car as characterized in claim 1, wherein top and bottom plates on said girders abut the angle bars at the side marginal edges of said web.

3. In a car, the combination with side girders, of a doorway frame having side extensions abutting the ends of said girders, and a sill below the plane of said girders, spliced plates connecting the side extensions of said frame to said girders at each side thereof and overlying the joints between said girders and the side extensions of said frame, and angle bars on both sides of said frame at the edges thereof adding rigidity thereto.

4. A doorway frame made of a single piece of material providing a web having an opening, a sill and a lintel connected by side rails, and vertical and transverse angle bars on the sill, lintel and side rails of said frame at the inner and outer edges thereof with the transverse angle bars at the upper and lower edges of the web opening between the vertical angle bars.

In testimony whereof I affix my signature in the presence of two witnesses.

AARON N. WARFIELD.

Witnesses:
ANNA M. DORR,
KARL H. BUTLER.